US012607252B1

(12) United States Patent　　　(10) Patent No.:　US 12,607,252 B1

Hodge　　　　　　　　　　　　　　(45) Date of Patent:　Apr. 21, 2026

(54) LIMITED SLIP DIFFERENTIAL WITH CONICAL FACES BETWEEN SIDE GEARS

(71) Applicant: Schaeffler Technologies AG & Co. KG, Herzogenaurach (DE)

(72) Inventor: Michael Hodge, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/092,314

(22) Filed: Mar. 27, 2025

(51) Int. Cl.
F16H 48/10　　　(2012.01)
F16H 48/285　　(2012.01)

(52) U.S. Cl.
CPC ........... F16H 48/10 (2013.01); F16H 48/285 (2013.01)

(58) Field of Classification Search
CPC .. F16H 48/08–11; F16H 48/28; F16H 48/285; F16H 2048/282
See application file for complete search history.

(56) References Cited

U.S. PATENT DOCUMENTS

| | | | | |
|---|---|---|---|---|
| 4,950,215 | A | | 8/1990 | Korner et al. |
| 5,310,389 | A | * | 5/1994 | Sato ......................... F16H 55/08 |
| | | | | 74/462 |
| 5,362,284 | A | * | 11/1994 | Brewer ................... F16H 48/10 |
| | | | | 475/252 |
| 5,624,346 | A | * | 4/1997 | Hirota .................... F16H 48/26 |
| | | | | 475/249 |
| 10,801,597 | B2 | * | 10/2020 | Inose ...................... F16H 48/10 |

FOREIGN PATENT DOCUMENTS

WO　　　WO-2016162033 A1 * 10/2016　............. F16H 48/28

* cited by examiner

*Primary Examiner* — James J Taylor, II

(74) *Attorney, Agent, or Firm* — Volpe Koenig

(57)　　　　　　　ABSTRACT

A limited slip differential for a vehicle includes a differential gear case, and first and second side gears supported by the differential gear case. The first and second side gears are engaged with each other along an interface, and the interface a non-flat profile, such as a conical or frustoconical profile. Depending on the angle of the conical or frustoconical profile, a torque bias ratio (TBR) of the limited slip differential can be adjusted.

13 Claims, 1 Drawing Sheet

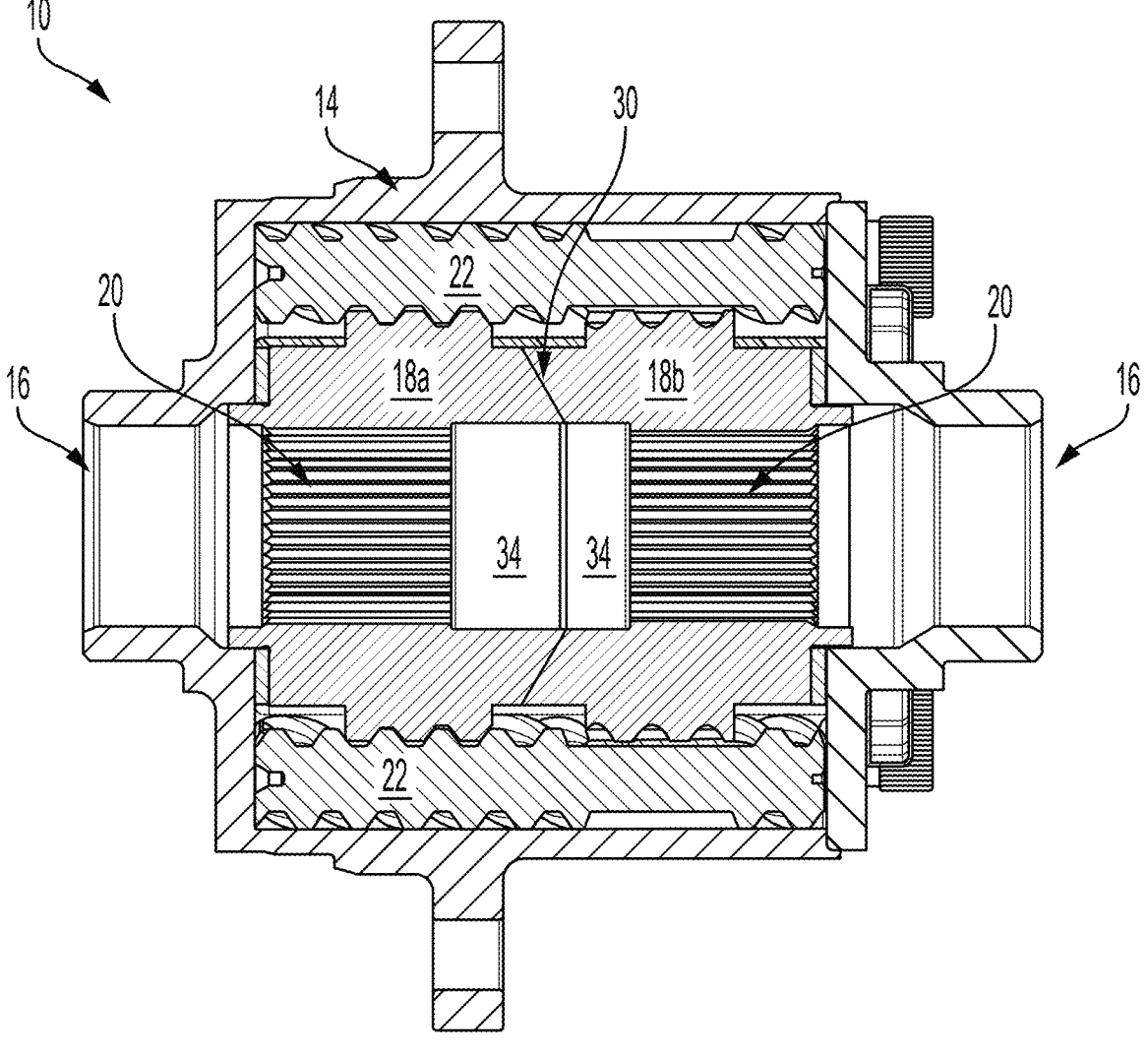

LIMITED SLIP DIFFERENTIAL WITH CONICAL FACES BETWEEN SIDE GEARS

TECHNICAL FIELD

The present disclosure relates generally to differentials for vehicle drive trains, and more specifically to limited slip differentials.

BACKGROUND

In general, limited slip differentials (LSD) are known structures used in motor vehicle for transmitting torque to the drive wheels.

LSDs are beneficial for some applications because they allow torque to be distributed to where it is needed. LSDs can compensate for reduced traction in one wheel by distributing the majority of the torque to the wheel with higher traction. The ratio of the torque to the high traction wheel divided by the torque to the low traction wheel is the torque bias ratio (TBR). The TBR in a helical gear style mechanical LSD is created by the axial and radial reaction forces from the helical gears increasing internal friction. Although these reaction forces are necessary for the TBR, it is also desirable to keep them as low as possible or reduce them while also maintaining the proper TBR. Reduced reaction forces allows the differential components to be smaller, fasteners to be smaller, and makes the gears, housing and cover more robust against wear from rotating contact.

The torque bias ratio (TBR) of a mechanical limited slip differential is determined by the internal friction created by the interaction of all of the components. The TBR is an important design parameter as it controls the amount of torque supplied to each wheel during a no-traction event.

SUMMARY

In accordance with one aspect a limited slip differential comprises a differential gear case, and first and second side gears supported by the differential gear case. The first and second side gears are engaged with each other along an interface, and the interface has non-flat profile.

The non-flat profile can be a conical or frustoconical profile. The limited slip differential can include a plurality of pinion gears meshed to radially outer sides of the side gears. The side gears can be supported for rotation by the differential gear case such that respective surfaces of the side gears forming the interface can rotate relative to each other. The side gears can include splines for rotationally coupling to respective axle shafts. The side gears can be supported by the differential gear case for limited axial movement relative to each other. The interface can comprise less than 50% of a diameter of the side gears. The interface can extend from a radially outer surface of the side gears to respective central bores of the side gears. The limited slip differential can be a helical gear type limited slip differential. The conical interface can axially align the side gears. The side gears can be engaged and axially aligned at the interface without a separate aligning sleeve intervening therebetween.

In accordance with another aspect, side gears for a limited slip differential comprise a first side gear having a first cross-sectional profile, and a second side gear having a second cross-sectional profile. The first cross-sectional profile and the second cross-sectional profile are mating cross-sectional profiles, the first side gear and the second side gear are configured to be supported in limited slip differential such that they can engage each other along an interface of the mating cross-sectional profiles, and the interface has non-flat profile.

The non-flat profile can be a conical or frustoconical profile. The side gears can include splines for rotationally coupling to respective axle shafts. The interface can comprise less than 50% of a diameter of the side gears. The interface can extend from a radially outer surface of the side gears to respective central bores of the side gears. The conical interface can axially align the side gears.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 1 is a cross-sectional view of an exemplary limited slip differential in accordance with the present disclosure.

DETAILED DESCRIPTION

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Referring to FIG. 1, an exemplary helical gear type limited slip differential (LSD) in accordance with the present disclosure is illustrated and identified generally by reference numeral 10. The LSD includes a differential gear case 14 integrally connected to a ring gear rotated by power output from a transmission, axle shafts (not shown) are inserted into openings 16 in both sides of the differential gear case 14 and coupled for rotation with a respective side gear 18a/18b. The side gears include splines 20 adapted to engage corresponding splines of the axle shafts. A plurality of pinion gears 22 are meshed to the radially outer sides of the side gears 18a/18b and supported at an inner side of the differential gear case 14 for maintaining a parallel position with the rotational axis of the side gears 18a/18b.

The helical gear type LSD operates to perform a differential operation according to resistance applied to wheels connected to the drive shafts and uses frictional force applied between the pinion gears 22 and the differential gear case 14 to restrain the differential operation.

When the resistance transmitted through the drive shafts from both wheels is equal, such as when the vehicle is travelling in a straight path, the differential gear case 14 and the side gears 18a/18b are integrally rotated and both axle shafts splined to the side gears 18a/18b are rotated at the same speed. When the vehicle is turned, the inner wheels have a larger resistance than that of the outer wheels, thereby causing the pinion gears 22 inside the differential gear case 14 to revolve and simultaneously rotate on their axes such that power is transmitted to the outside wheels and the outside wheels are made to rotate at a speed faster than that of the inside wheels.

In accordance with the present disclosure, axial end faces of the side gears 18a/18b define an interface 30. In the illustrated embodiment, the interface 30 is a non-flat conical or frustoconical profile. Other non-flat profiles are also contemplated, such as spherical, for example. As will be appreciated, the side gears 18a/18b will be compressed together by the axial reaction forces from the helical gears when the LSD 10 is driven in the forward direction and experiencing a differential output. The conical interface between the two side gears 18a/18b thus provides a predetermined and/or desired friction between the side gears 18a/18b that affects the TBR during differential operation of the LSD 10 in the forward direction. By changing the angle of the cone, the friction between the side gears 18a/18b can be adjusted in a manner similar to a cone clutch. In this regard, a relatively flatter cone will typically produce less friction than a relative steeper cone. Although the illustrated interface 30 is conical, other profiles are possible.

The conical interface 30 in the exemplary embodiment comprises generally less than half of the diameter of the side gears 18a/18b. The conical interface 30 extends from a radially outer surface of the side gears 18a/18b to respective central bores 34 of the side gears.

The conical interface 30 also obviates the need for a separate alignment sleeve for axially aligning the side gears 18a/18b that is typically used in existing limited slip differentials.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 limited slip differential
14 differential gear case
16 openings
18a side gear
18b side gear
20 splines
22 pinion gear
30 interface
34 central bore

What is claimed is:

1. A limited slip differential comprising:
a differential gear case; and
first and second side gears supported by the differential gear case;
wherein the first and second side gears are engaged with each other along an interface;
wherein the interface has a non-flat profile;
wherein the non-flat profile is a conical or frustoconical profile; and
wherein the interface comprises less than 50% of a diameter of the side gears.

2. The differential as set forth in claim 1, further comprising a plurality of pinion gears meshed to radially outer sides of the side gears.

3. The differential as set forth in claim 1, wherein the side gears are supported for rotation by the differential gear case such that respective surfaces of the side gears forming the interface can rotate relative to each other.

4. The differential as set forth in claim 1, wherein the side gears include splines for rotationally coupling to respective axle shafts.

5. The differential as set forth in claim 1, wherein the side gears are supported by the differential gear case for limited axial movement relative to each other.

6. The differential as set forth in claim 1, wherein the interface extends from a radially outer surface of the side gears to respective central bores of the side gears.

7. The differential as set forth in claim 1, wherein the limited slip differential is a helical gear type limited slip differential.

8. The differential as set forth in claim 1, wherein the conical interface axially aligns the side gears.

9. The differential as set forth in claim 8, wherein the side gears are engaged and axially aligned at the interface without a separate aligning sleeve intervening therebetween.

10. Side gears for a limited slip differential comprising:
  a first side gear having a first cross-sectional profile; and
  a second side gear having a second cross-sectional profile;

wherein the first cross-sectional profile and the second cross-sectional profile are mating cross-sectional profiles;
  wherein the first side gear and the second side gear are configured to be supported in the limited slip differential such that they can engage each other along an interface of the mating cross-sectional profiles; and
  the interface has a non-flat profile;
  wherein the non-flat profile is a conical or frustoconical profile; and
  wherein the interface comprises less than 50% of a diameter of the side gears.

11. The side gears of claim 10, wherein the side gears include splines for rotationally coupling to respective axle shafts.

12. The side gears of claim 10, wherein the interface extends from a radially outer surface of the side gears to respective central bores of the side gears.

13. The side gears of claim 10, wherein the conical interface axially aligns the side gears.

\* \* \* \* \*